(12) United States Patent
Eteminan et al.

(10) Patent No.: US 8,694,968 B2
(45) Date of Patent: *Apr. 8, 2014

(54) SYSTEM FOR CREATING PERSONALIZED AND CUSTOMIZED MOBILE DEVICES

(75) Inventors: Isaac Eshagh Eteminan, Rancho Santa Fe, CA (US); Marco Carosi, Rome (IT); Harish Shanthi Kumar, Bangalore (IN); James William Bishop, Jr., Colorado Springs, CO (US); Vinay Puthiya Kovilakam, Bangalore (IN)

(73) Assignee: Foneclay, Inc., Rancho Santa Fe, CA (US)

( * ) Notice: Subject to any disclaimer, the term of this patent is extended or adjusted under 35 U.S.C. 154(b) by 249 days.

This patent is subject to a terminal disclaimer.

(21) Appl. No.: 13/102,032

(22) Filed: May 5, 2011

(65) Prior Publication Data

US 2011/0208338 A1   Aug. 25, 2011

Related U.S. Application Data

(63) Continuation-in-part of application No. 12/649,947, filed on Dec. 30, 2009.

(51) Int. Cl.
   *G06F 9/44* (2006.01)
(52) U.S. Cl.
   USPC ........... 717/124; 717/103; 717/110; 717/113; 717/126
(58) Field of Classification Search
   None
   See application file for complete search history.

(56) References Cited

U.S. PATENT DOCUMENTS

| | | |
|---|---|---|
| 2002/0033843 A1 | 3/2002 | Loos et al. |
| 2003/0139199 A1 | 7/2003 | Kinnula et al. |
| 2007/0010195 A1 | 1/2007 | Brown et al. |
| 2010/0005410 A1 | 1/2010 | Pang |
| 2011/0161912 A1* | 6/2011 | Eteminan et al. ............. 717/101 |

* cited by examiner

*Primary Examiner* — Chuck Kendall
(74) *Attorney, Agent, or Firm* — Thomas D. Foster; Bruce Hare

(57) ABSTRACT

This invention provides a mobile device ecosystem that is simpler than existing options for all of its participants regardless of their role or business model. The ecosystem includes a mobile device and operating software development kit and store, both of which are implemented as web-based services such that creation, testing, and distribution of customized mobile devices, as well as discovery, investigation, and delivery of same, can all be performed using a standard web browser and includes features that facilitate communication, interaction, community, and sharing among and between creators, users, and other interested parties. The device and operating software store is also not specific to any mobile device brand or brand group, and integrates with both branded and independent application stores. The web-based development kit and store are integrated with one another such that creation of new devices, operating software packages, and applications can be accelerated by incorporation or customization of existing items or components thereof.

36 Claims, 8 Drawing Sheets

SYSTEM FOR CREATING PERSONALIZED AND CUSTOMIZED MOBILE DEVICES

CROSS REFERENCE TO RELATED APPLICATIONS

This application claims the benefit of, and is a continuation-in-part of, application Ser. No. 12/649,947, filed Dec. 30, 2009, which is incorporated herein by reference in its entirety.

TECHNICAL FIELD OF THE INVENTION

The present invention pertains in general to personalization and customization of mobile device hardware and operating system software. The present invention pertains in particular to a system that enables end users and others, such as branding organizations or support personnel, to create mobile devices with hardware and operating software specific to their needs.

BACKGROUND OF THE INVENTION

There exists today a wide variety of small, typically handheld, electronic appliances known generally as mobile internet devices, including in particular the vast array of products commonly known as mobile phones and tablets. In the current state of the art, all such devices are designed by their manufacturers to include a variety of hardware capabilities, such as cameras or positioning system receivers, selected by the manufacturer to address as many potential customers as possible. Similarly, manufacturers determine the form factor, that is, the size, shape, weight, color, and other physical attributes, of each product, with the goal to satisfy the greatest possible number of users with the fewest specific combinations. Finally, manufacturers configure the operating software of their devices to provide a variety of functions such that a particular function or related group of functions is performed in exactly the same way on as many device models as possible.

The practice of limiting the number of hardware and software combinations benefits the device manufacturers by reducing the complexity of the various systems and procedures they use for product development, manufacturing, sales, and customer support. The primary mechanism current manufacturers use for determining what, exactly, a particular new product should look like and do is a complex function in which the costs and benefits of their existing capabilities interact with the desires of customers. In general, however, the desires of end users are considered entirely in the aggregate, as presented by wholesale customers such as wireless carriers and major retailers, and occasionally as interpreted through observational research that categorizes people by seemingly sensible but ultimately arbitrary attributes.

Manufacturers recognize that individual end users and smaller groups of end users tend to have special needs for which the mass production processes described above cannot provide cost-effective point solutions. Therefore, current and emerging mobile devices provide a great deal of programmability through the provision of software applications, or "apps" as they are commonly called. These apps allow people to add a wide variety of software functionality to their mobile devices. U.S. patent application Ser. No. 09/126,49947 entitled "System for Creation and Distribution of Software Applications Usable on Multiple Mobile Device Platforms" and incorporated herein by reference, discloses a comprehensive system that enables the creation of such apps by a wide variety of people, including end users.

However, apps do not in general provide the ability to tune the base operating software of a particular class of mobile device. That is, for the functions provided in the operating software, the manufacturer generally constrains the look and feel, the functional interactions, and the basic behavior of the mobile device so that even with apps those functions are unchanged, except perhaps for minor preferences settings. For example, a mobile phone device that provides such common capabilities as an Address Book, Telephony Service, and Short Message Service will provide a specific presentation for these capabilities, as well as a specific way of interacting between them, according to the manufacturer's style and software development history. The operating software performing these functions will generally offer minor configurability options, such as whether to use text labels or graphic icons for identifying and selecting each function, but it generally does not offer any ability to make significant changes to how the capabilities and their associated functions interact with one another or with other apps.

Further, add-on software apps inherently cannot offer any ability to change the specific hardware built into a mobile device. While most mobile devices provide connectors and slots for adding or connecting hardware modules that provide optional capabilities, and coupled with software apps these hardware add-ons can be quite sophisticated, here too this practice is limited to adding modules that aren't in the base device. It cannot remove a built-in device that is not wanted.

Finally, neither add-on software apps nor plug-in hardware modules offer any ability to change the form factor of a device completely. End users with a variety of special needs, or with preferences that simply do not align with the mass market, are generally left unsatisfied by the available options.

What is needed, then, is a system whereby end users or others acting on behalf of a group of end users may create personal or custom configurations of mobile devices, and have them manufactured in lots as small as a single unit. Such a system would preferably also provide a distribution mechanism, so that others who may have similar needs can find and purchase existing custom configurations, or modify an existing one further.

SUMMARY OF THE INVENTION

It is thus the principal aim of the present invention to create a mobile device manufacturing and distribution system that enables extreme customization of both hardware, including form factor attributes and built-in modules, and operating software. Accordingly, it is an advantage of the present invention that a mobile device development kit and store are provided as a web-based service such that creation, testing, and distribution of customized mobile devices, as well as discovery, investigation, and delivery of same, can all be performed using a standard web browser. It is a further advantage that the mobile device development kit according to the present invention offers the ability to devise and configure a unified suite of operating software capabilities specific to the needs of an end user, who may or may not be a professional software engineer, and have it installed in a selected mobile device. It is a further advantage that the mobile device development kit according to the present invention offers the ability to design a mobile device that meets very specific needs by selecting from a variety of hardware modules, form factors, colors, and other configurable attributes, then to have that mobile device manufactured, loaded with the desired operating software, and delivered. Another advantage of the present invention is that it also provides the ability to save a particular mobile device design and make it available for use, as well as further modification as necessary, by other users with similar special needs or preferences. A final advantage of the present invention is that it builds upon the foundation provided by the app development and distribution system, hereinafter referred to as "the foneClay Apps system," described in U.S. patent application Dec. 30, 2009 "System for Creation and Distribution of Software Applications Usable on Multiple Mobile Device Platforms," hereinafter referred to as "the foneClay Apps patent application," and therefore incorporates many of the other advantages provided by that system.

The above and other advantages of the present invention are carried out in one form by a system of cooperating elements, each of which is described in detail below.

BRIEF DESCRIPTION OF THE DRAWINGS

The invention will be better understood from a reading of the following detailed description in conjunction with the drawing figures, in which like reference designators are used to identify like elements and in which.

DETAILED DESCRIPTION OF THE PREFERRED EMBODIMENTS

Figure 1:
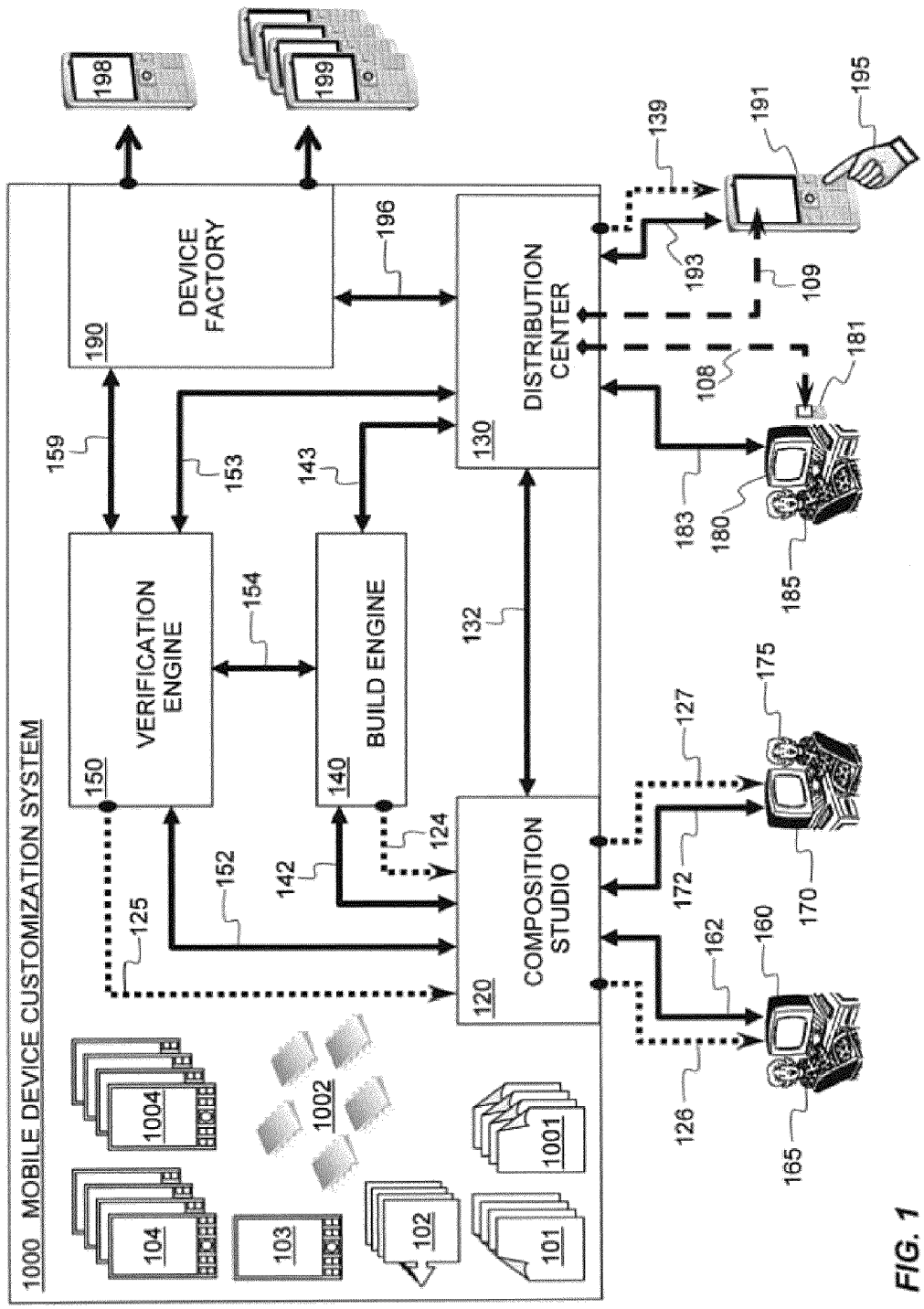
FIG. 1 illustrates a high-level block diagram of a Mobile Device Customization System in accordance with the present invention.

The high-level diagram of FIG. 1 depicts the primary elements of the present invention, including the main system, its major subsystems and key internal elements, and the key external elements with which it interacts. In the diagram, Mobile Device Customization System 1000 embodies the functionality as outlined in the Summary section above and detailed in the subsystem descriptions that follow. The functions of Mobile Device Customization System 1000 are allocated among five major subsystems, with interactions among them as shown. In addition, six key internal elements are shown, which embody the reason for existence of Mobile Device Customization System 1000 in the first place.

Note also that as an extension of the Mobile Application Factory System 100 described in the foneClay Apps patent application, Device Customization System 1000 incorporates numerous elements of the foneClay Apps system. Except where noted herein, elements with names and numbers that match those of elements in the foneClay Apps system are identical to the elements as described in the foneClay Apps patent application. As an extension of the foneClay Apps system, Device Customization System 1000 may also be referred to as the foneClay Device system.

To the four key internal elements of the foneClay Apps system, which are Mobile Device Applications 101, Mobile Device Application Components 102, Generic Mobile Device Model 103, and Specific Mobile Device Models 104, Device Customization System 1000 adds Mobile Device Operating Software Packages 1001, Mobile Device Component Models 1002, and Custom Mobile Device Models 1004.

Each Operating Software Package 1001 is a complete set of logic and data created by a developer to perform all desired functions available to the user of a mobile device. By way of example, but without limitation, an Operating Software Package 1001 may provide basic telephony and address book functionality and allow nothing else, it may provide an alternate user interface to every traditional function of a typical mobile device, or it may provide any combination in between. An Operating Software Package 1001 may incorporate specific Applications 101 and Application Components 102 by design, and it may or may not permit an end user to extend its functionality by downloading and running Applications 101 using the foneClay Apps system. Note that while FIG. 1 depicts just four Operating Software Packages 1001, in a preferred embodiment the actual number is essentially unlimited.

Each Device Component Model 1002 embodies a representation of a hardware or software component that may be used in the design and construction of a mobile device, including not only its functionality, behaviors, and interfaces, but also its physical attributes such as size, weight, pinouts, electromagnetic properties, and so forth. Examples of real components that may be represented by Component Models 1002 include numerous items well known to those skilled in the art, such as without limitation, modules for wireless connectivity with a cellular network, Wifi hot spots, and Bluetooth devices; support for communication modes such as signalling, circuit calls, and packet transmission and reception; ports for wired connectivity with nearby devices such as a headphone jack and a USB connector; various human interface devices including primary and optional secondary video display screens, numeric and alphabetic keypads, keypad backlights, miscellaneous buttons that activate functions such as speaker volume control and others, touchpads and multi-touch gesture input pads, speakers and microphones; environment sensors and effectors such as accelerometers or motion and orientation sensors, cameras or light sensors, Global Positioning System (GPS) receivers and other location sensors, mechanical vibration generators and other haptic effectors, and thermometers and other temperator sensors. Again, note that while FIG. 1 depicts just five Component Models 1002, in a preferred embodiment the actual number of these elements is essentially unlimited.

In a preferred embodiment of the invention, Component Models 1002 are primarily preloaded and represent only off-the-shelf components available to any manufacturer of mobile devices. In an alternate embodiment, with appropriate extensions to Composition Studio 120, described hereinafter, it is possible to enable development of new Component Models 1002 within Device Customization System 1000.

Realization of Component Models 1002 enables the development of actual devices, rather than just apps, using extensions to the remaining subsystems of Device Customization System 1000 as described hereinafter. In the design phase, such actual devices are represented in System 1000 by Custom Mobile Device Models 1004, which go beyond the Specific Mobile Device Models 104 of the foneClay Apps system, which embody off-the-shelf devices on which foneClay Apps may run, to embody the entire design of a complete custom device that can be manufactured and delivered to a customer as a Personalized Mobile Device 198, or even produced in quantity as Mass-Customized Mobile Devices 199.

The first major subsystem, Composition Studio 120, embodies the functions associated with a development environment, providing the ability to develop not only Applications 101 and Application Components 102 as in the foneClay Apps system, but also in this Device Customization System 1000 it provides the ability to develop complete Operating Software Packages 1001, actual components as represented by Component Models 1002, and actual complete devices as represented by Custom Device Models 1004. Composition Studio 120 supports multiple programming and modeling paradigms, natively including at least a novice mode suitable for Novice Developer 165 and an expert mode suitable for Expert Developer 175. Non-native modes may also be supported by importing them into Composition Studio 120. For example, programming modes may be extended as described in the foneClay Apps patent application, and modeling modes may be extended by incorporating Computer-Aided-Design (CAD) and Computer-Aided-Manufacturing (CAM) tools such as Pro/E, Autodesk, or SpaceClaim. User level options as described in the foneClay Apps patent application are applicable to both the programming mode set and the modeling mode set here.

As in the foneClay Apps system, a user of Composition Studio 120 accesses its capabilities using a computer workstation or personal computer, as is typical of such tools and well-known to those skilled in the art. In FIG. 1, Novice Developer 165 employs Computer 160 for this purpose, while Expert Developer 175 employs Computer 170 similarly. In either case, the actual implementation of Composition Studio 120 is itself a software program executing in a computer. The two execution modes described in the foneClay Apps patent application, using Embedments 126 and 127 and communicating via Network Connections 162 and 172 respectively, are applicable here as well. Detail regarding additional elements of Composition Studio 120 specific to Device Customization System 1000 are provided in the description of FIG. 2.

The second major subsystem, Distribution Center 130, embodies the functions associated with an application repository ("app store") as in the foneClay Apps system, but in Device Customization System 1000 it also serves as a repository for Operating Software Packages 1001, Component Models 1002, and Custom Device Models 1004. Distribution Center 130 continues to support discovery of, education on, demonstration of, experimentation with, and finally acquisition of the various items produced in both the foneClay Apps system and the foneClay Device system.

Distribution Center 130 interacts with Internet Customer 185, her Computer 180 and Mobile Device 181, as well as Mobile Customer 195 and his Mobile Device 191, as described in the foneClay Apps patent application using Network Connections 183 and 193, respectively, along with Embedment 139 in the latter case. Application Downloads 108 and 109 are retained in Device Customization System 1000, and are applicable also to downloading Operating Software Packages 1001 in addition to Applications 101. Support for Operating Software Packages 1001 is extended to Developers 165 and 175 as well, through Interaction 132 and Composition Studio 120 as described in the foneClay Apps patent application.

Similarly, the various community, rating, and reputation capabilities of Distribution Center 130, as described in the foneClay Apps patent application, are extended to Operating Software Packages 1001, Component Models 1002, and Custom Device Models 1004 in the present invention.

New to Device Customization System 1000 is the ability for Distribution Center 130 to enable ordering of Personalized and Mass-Customized Devices 198 and 199. This occurs via Interaction 196 with Device Factory 190, which is described hereinafter.

Figure 3:
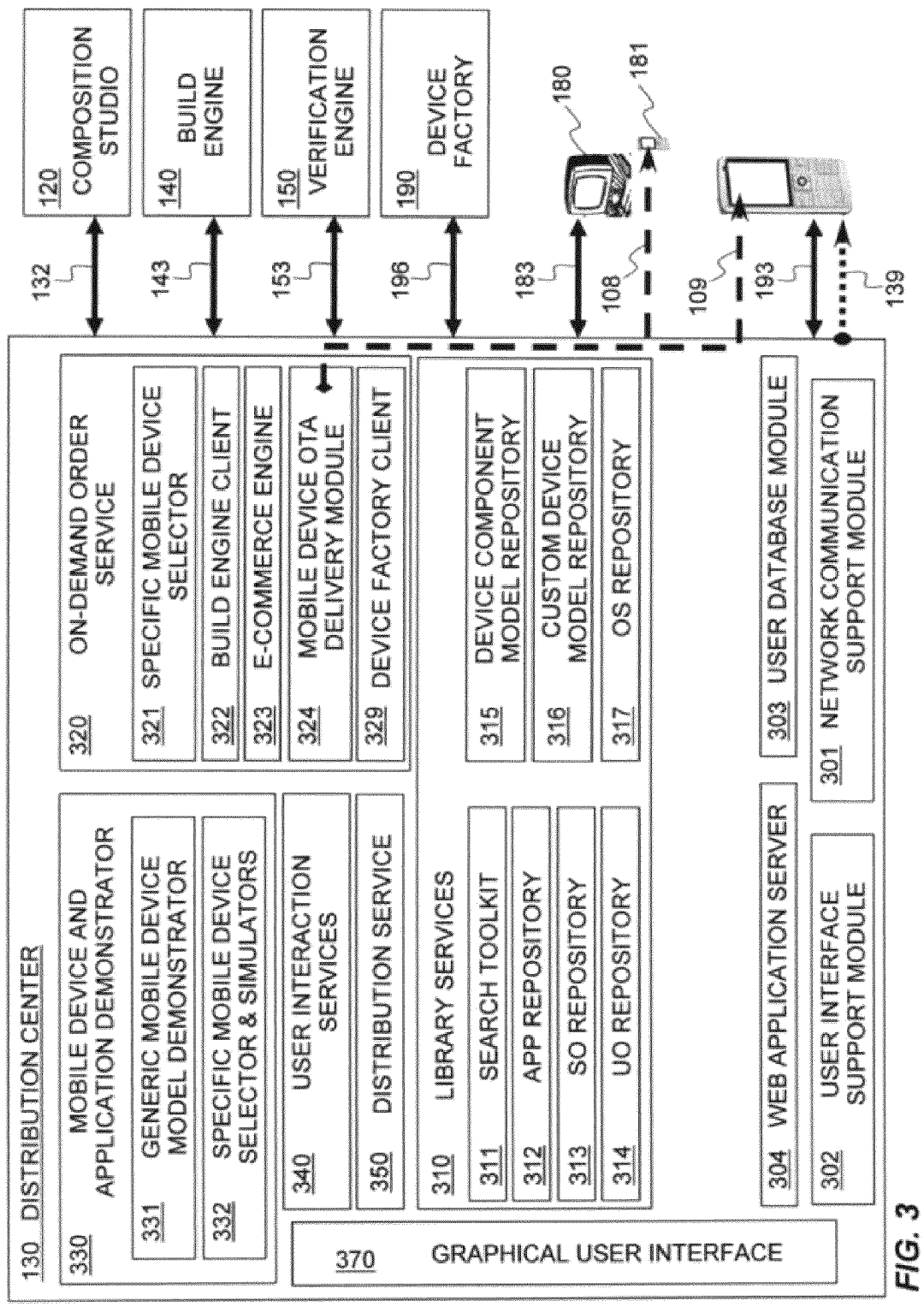
FIG. 3 illustrates a detailed functional block diagram of a Mobile Device Distribution Center in accordance with the present invention.

More detail regarding Distribution Center 130 is provided in the description of FIG. 3.

The third major subsystem, Build Engine 140, in the present invention extends its compilation and linking services beyond Applications 101 and Application Components 102 to encompass Operating Software Packages 1001 as well. In addition, in Device Customization System 1000 the Build Engine 140 also provides layout and composition capabilities typical of CAD/CAM software, in support of Composition Studio 120, in order to prepare Component Models 1002 and Custom Device Models 1004. It continues to cooperate with Composition Studio 120, Distribution Center 130, and Verification Engine 150 via Interactions 142, 143, and 154, respectively, as described in the foneClay Apps patent application.

Figure 4:
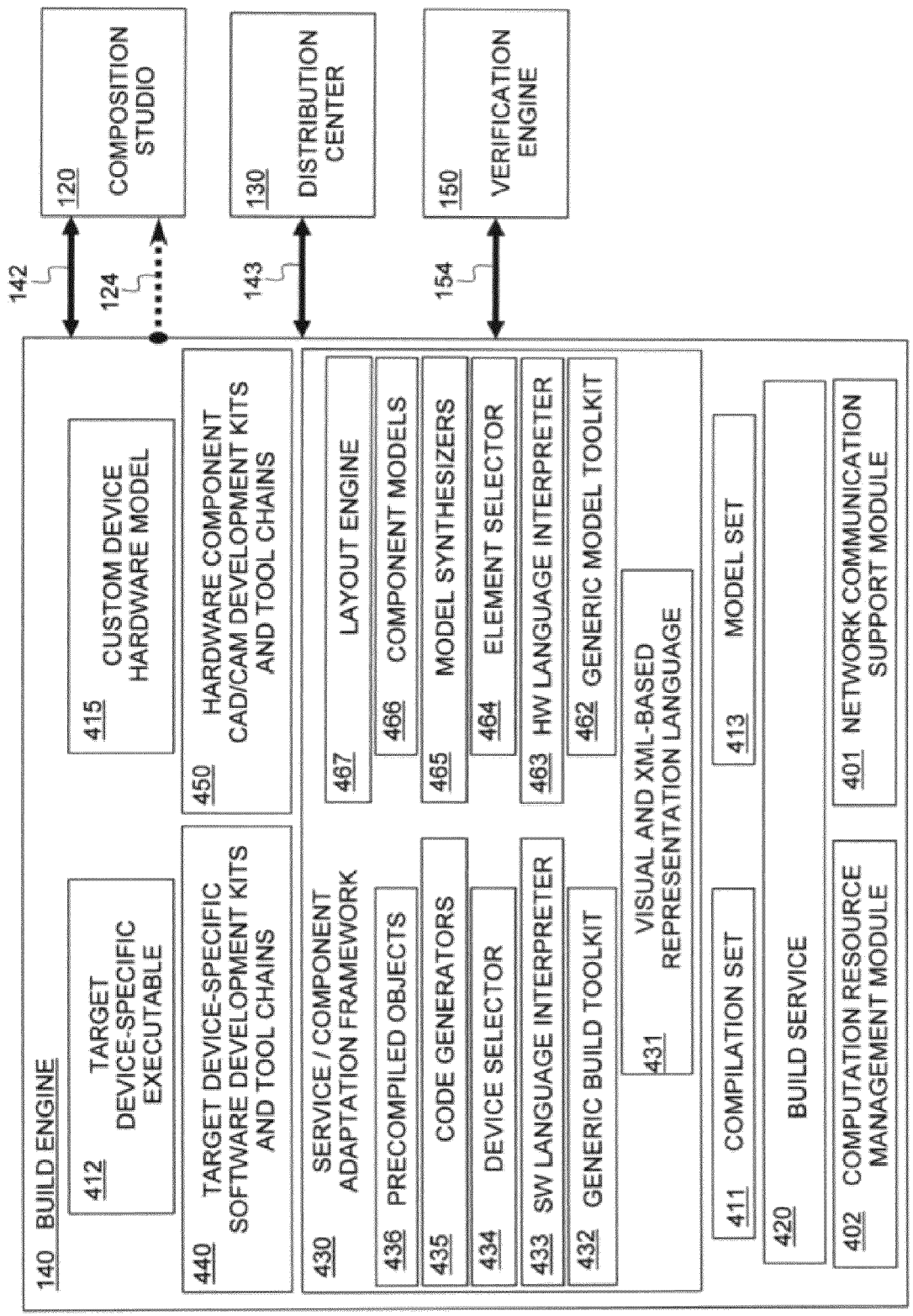
FIG. 4 illustrates a detailed functional block diagram of a Mobile Device Build Engine in accordance with the present invention.

More detail regarding Build Engine 140 is provided in the description of FIG. 4.

The fourth major subsystem of Mobile Device Customization System 1000 is Verification Engine 150, which provides mobile device simulation and testing capabilities used by developers and the other subsystems during development, build, or manufacturing of any foneClay Apps system or foneClay Device system product. It continues to cooperate with Composition Studio 120, Distribution Center 130, and Build Engine 140 via interactions 152, 153, and 154, respectively, as well as via Embedment 125, as described in the foneClay Apps patent application, with extensions described hereinafter to support the new products of the present invention. New for Device Customization System 1000, Verification Engine 150 also cooperates with Device Factory 190 via Interaction 159, to support manufacturability testing of Custom Device Models 1004 and Device Component Models 1002 during development, and to support factory testing of Devices 198 and 199 prior to their delivery.

Figure 5:
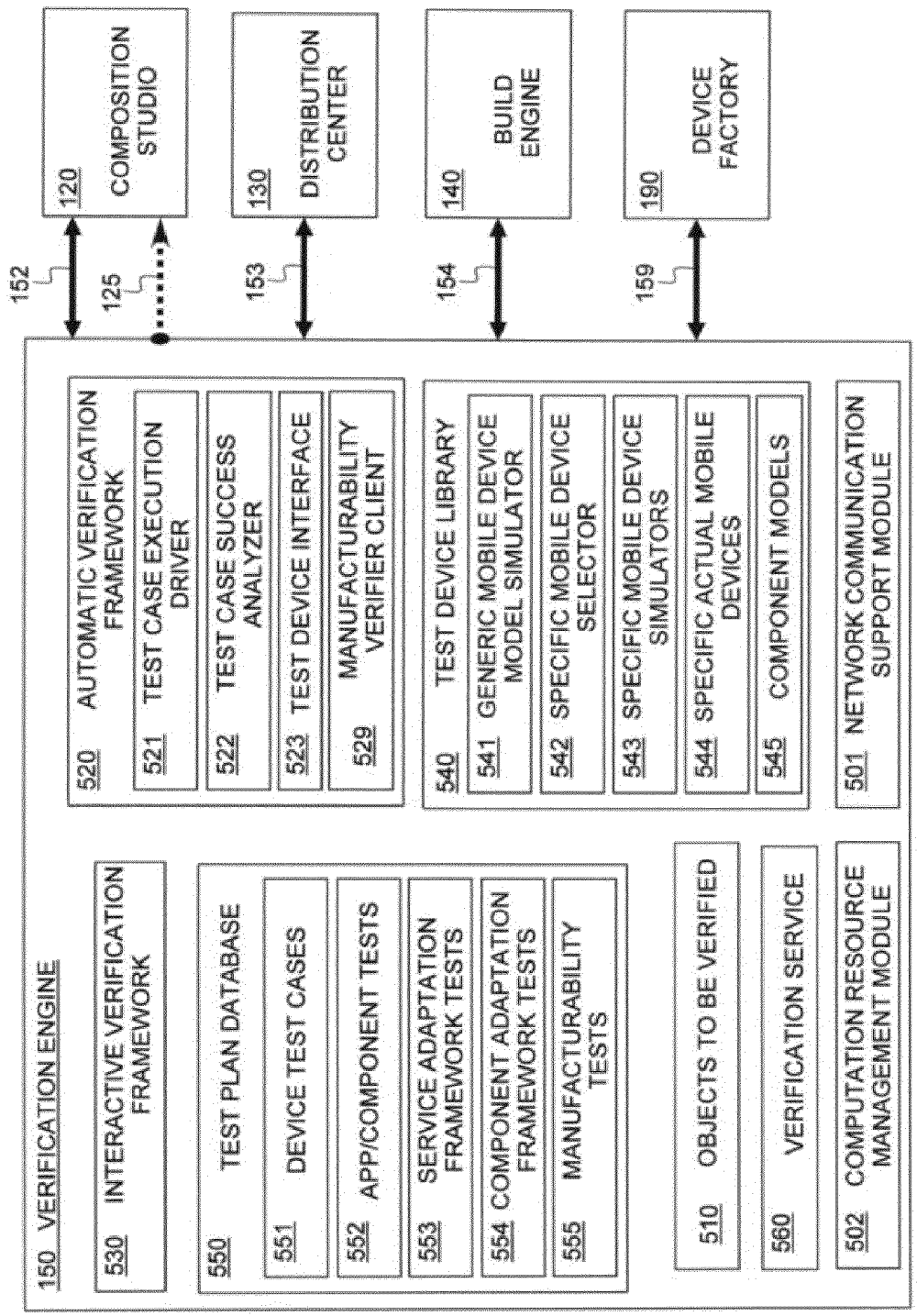
FIG. 5 illustrates a detailed functional block diagram of a Mobile Device Verification Engine in accordance with the present invention.

More detail regarding Verification Engine 150 is provided in the description of FIG. 5.

The fifth and final major subsystem of Mobile Device Customization System 1000 is Device Factory 190, which provides physical manufacturing of Personalized Devices 198 and Mass-Customized Devices 199, on behalf of Distribution Center 130 as communicated via Interaction 196. Device Factory 190 also supports manufacturability testing of Custom Device Models 1004 and Device Component Models 1002 on behalf of Verification Engine 150 as communicated via Interaction 159.

Figure 8:
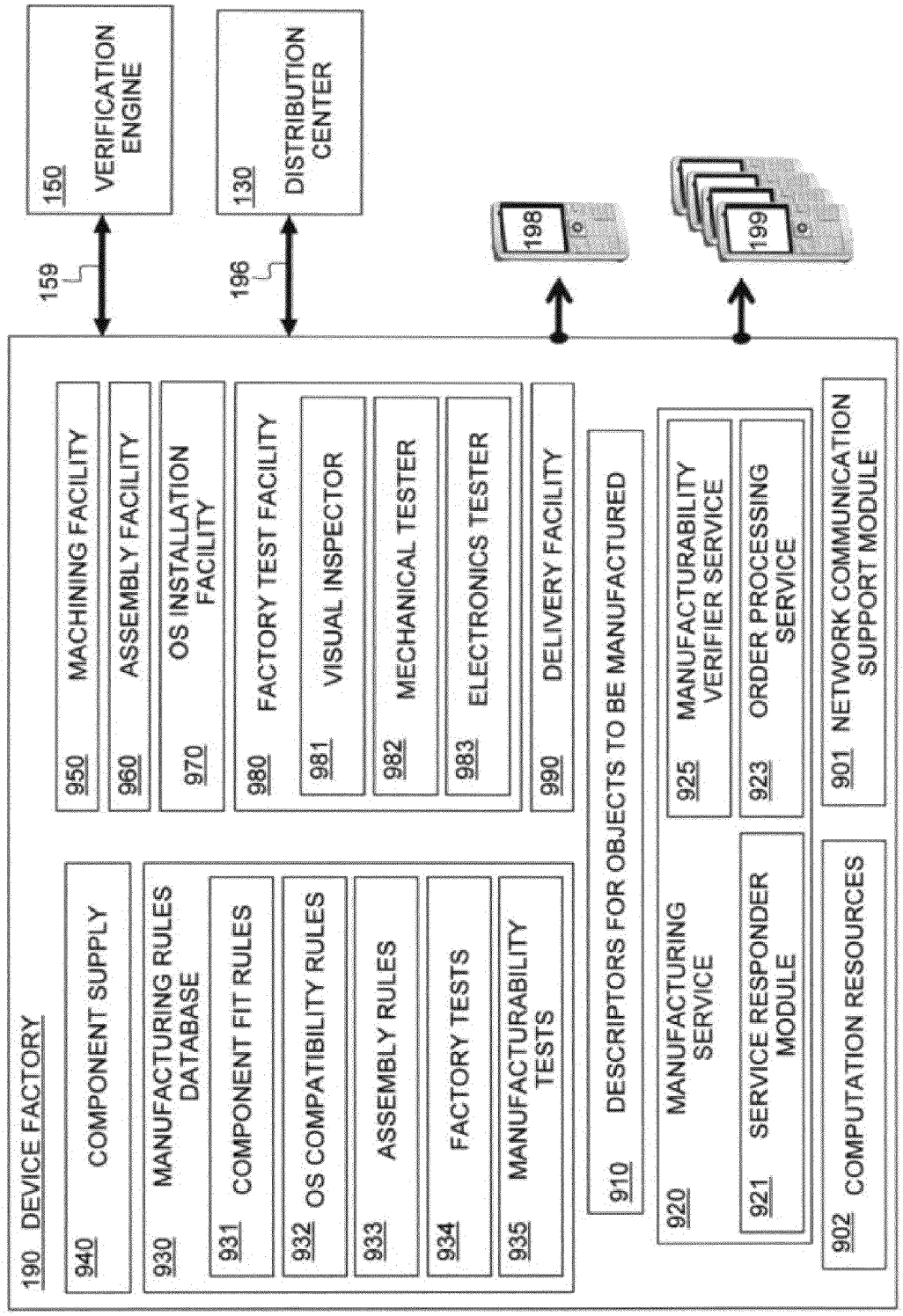
FIG. 8 illustrates a detailed functional block diagram of a Mobile Device Manufacturing Facility, or Device Factory, in accordance with the present invention.

More detail regarding Device Factory 190 is provided in the description of FIG. 8.

Figure 2:
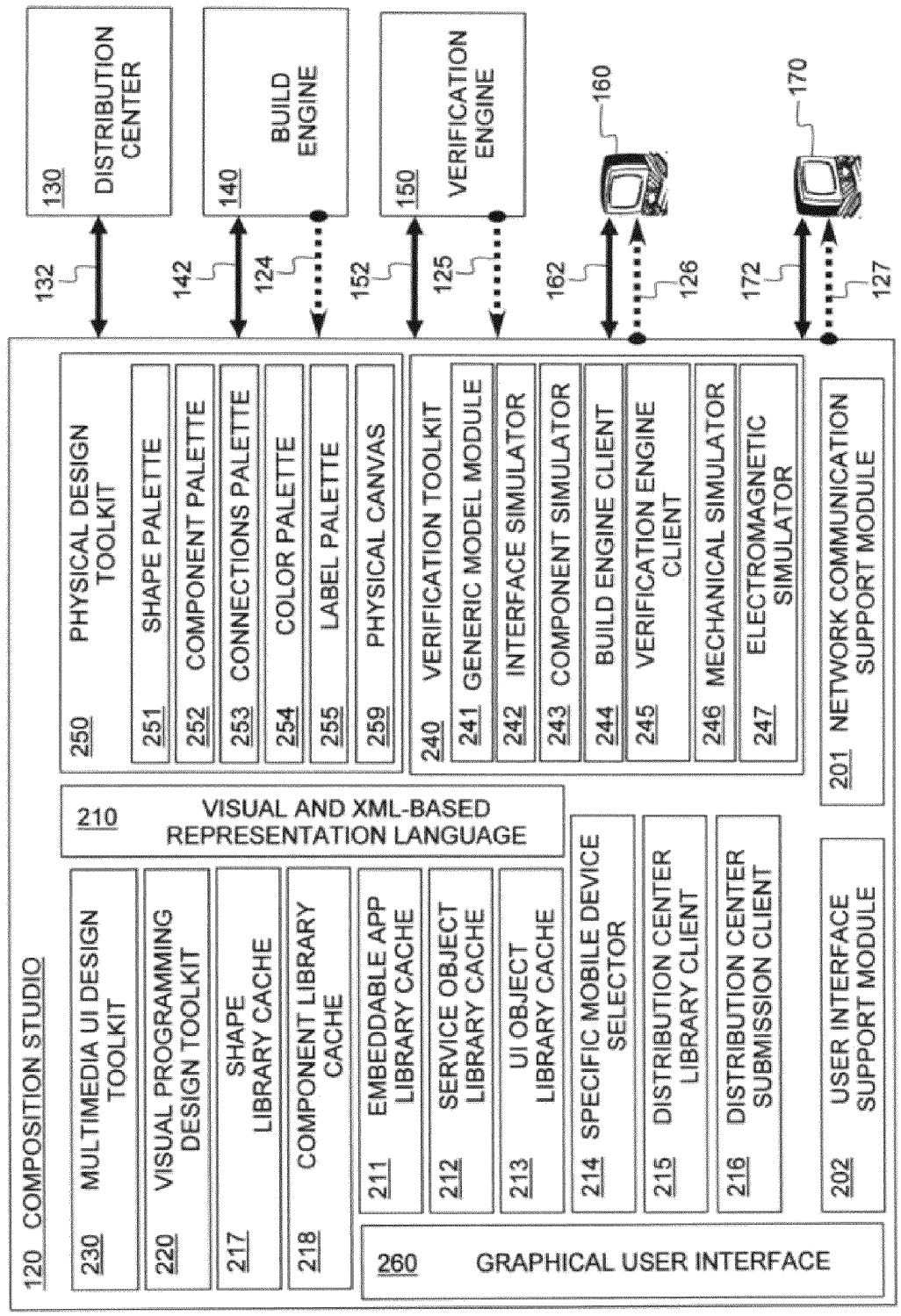
FIG. 2 illustrates a detailed functional block diagram of a Mobile Device Composition Studio in accordance with the present invention.

FIG. 2 depicts Composition Studio 120 in more detail, showing the major functional modules that embody the functionality outlined in the FIG. 1 description. As in FIG. 1, the significant external interfaces and corresponding cooperating elements outside Composition Studio 120 are also shown. The Distribution Center 130, Build Engine 140, Verification Engine 150, Service Interactions 132, 142, and 152, Embedments 124 and 125, Computers 160 and 170, Network Connections 162 and 172, and Embedments 126 and 127 shown in FIG. 2 are substantially as already described in the context of FIG. 1 and the foneClay Apps patent application.

Starting at the bottom of the diagram are fundamental modules typically found in any modern software program.

Network Communication Support Module 201 provides connectivity with other subsystems of Device Customization System 1000, and User Interface Support Module 202 provides tools for presenting information visually to a user of Composition Studio 120, such as Novice Developer 165. These modules are exactly as described in the foneClay Apps patent application.

Fundamental to Composition Studio 120, as an environment for creation note only of Applications 101 but also Operating Software Packages 1001 and Custom Device Models 1004, is the Visual and XML-Based Representation Language 210. It is this language in which developers will express the logical, structural, temporal, graphical, physical, and other elements of their ideas for a foneClay Apps system or foneClay Device system product. This language is substantially as described in the foneClay Apps patent application, extended in the present invention to express physical attributes and componentry using language elements similar to those used in common CAD/CAM software.

Thus, Visual and XML-Based Representation Language 210 underlies and interlaces all the modules of Composition Studio, as the general form in which are expressed all the various aspects of any Application 101, Application Component 102, Operating Software Package 1001, Component Model 1002, or Custom Device Model 1004.

Visual Programming Design Toolkit 220 and Multimedia User Interface (UI) Design Toolkit 230 continue to be major modules and remain as described in the foneClay Apps patent application. In the present invention they also support design of Operating Software Packages 1001, which are quite similar to Applications 101 except that they are designed to stand alone as the base operating software of a device rather than to augment its existing operating software.

New for the present invention is Physical Design Toolkit 250, which provides the same sort of capability as the older toolkits, in particular retaining the palette and canvas metaphor for workflow, but specifically designed for expression of physical designs on Physical Canvas 259. Shape Palette 251 provides tools for defining the form and form factor of a Custom Device Model 1004, while Color Palette 254 and Label Palette 255 enable its decoration. Component Palette 252 provides tools for selecting and arranging internal and external parts, in particular those represented by Device Component Models 1002 as described above. Connections Palette 253 enables the placement of interactions among the selected components, as well as interactions with software elements such as the User Interface and Service objects used to construct Applications 101, Application Components 102, and Operating Software Packages 1001.

Similarly, the various Library Caches from the foneClay Apps system Composition Studio are retained here, including Embeddable App Library Cache 211, Service Object Library Cache 212, and UI Object Library Cache 213. They are joined in the present invention by Shape Library Cache 217 and Component Library Cache 218, which provide the objects used in the Physical Design Toolkit 250.

Device Selector 214, Library Client 215, and Submission Client 216 are substantially as described in the foneClay Apps patent application, extended to support the new products of the present invention.

Verification Toolkit 240 remains an essential part of Composition Studio 120. As with the other modules, it is extended in the present invention to simulate and test the physical aspects of a design. Generic Model Module 241 is the same as Generic Device Model Testing Module 241 from the foneClay Apps patent application, with its name shortened to fit better on the drawing. Interface Simulator 242 is similar to the Generic Mobile Device Interface Simulator 242 from the foneClay Apps system, but in the present invention it is extended in two directions. First, it provides variants to simulate the user interface look and feel of Specific Mobile Device Models 104, as well as that of any selected Operating Software Package 1001. Second, it provides skins to simulate the form, layout, and decoration of any Specific Mobile Device Model 104 or Custom Mobile Device Model 1004. Likewise, Component Simulator 243 is similar to the Generic Mobile Device Capability Simulator 243 from the foneClay Apps patent application, again extended in the present invention to support testing of arbitrary Component Models 1002.

Build Engine Client 244 and Verification Engine Client 245 are substantially the same as their predecessors, once again extended to carry the additional design information provided by the Physical Design Toolkit 250, Component Models 1002, and Custom Device Models 1004.

In the present invention, Verification Toolkit 240 is enhanced by the addition of simulation environments for handling the physical elements of a design. Mechanical Simulator 246 provides tools for modeling and verifying thermal, structural, and other mechanical aspects. Electromagnetic Simulator 247 similarly provides tools for modeling and verifying electrical, electronic, magnetic, and radio frequency aspects of a design. Both of these elements are implemented in a preferred embodiment by incorporation of popular existing tools, modified to match the foneClay look and feel, simplified and integrated as necessary to meet the needs of both Novice Developer 165 and Expert Developer 175, and integrated with Verification Engine 150 through Verification Engine Client 245 as necessary to minimize computing demands on end user Computers 160 or 170.

Figure 6:
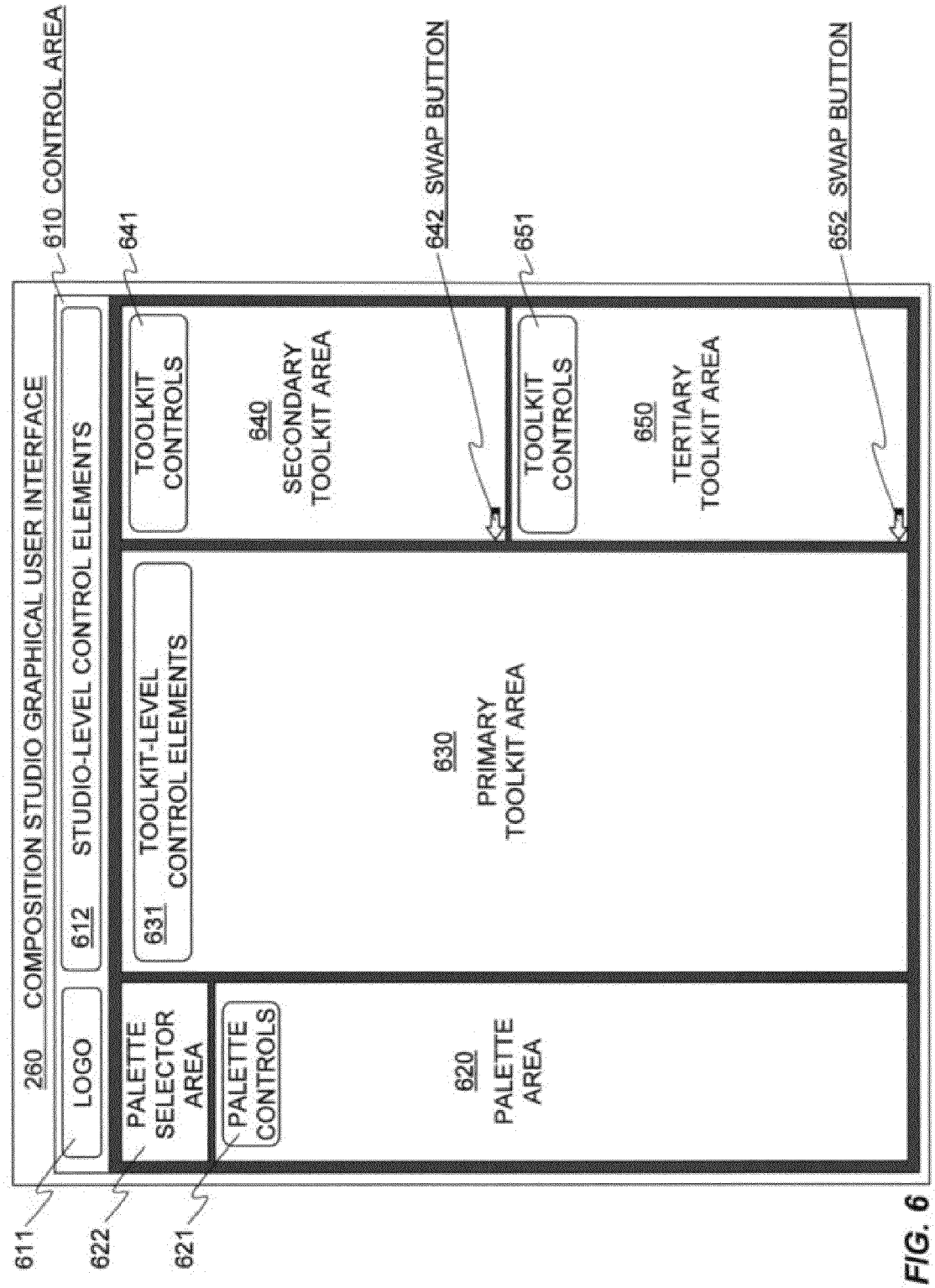
FIG. 6 illustrates an exemplary graphical user interface presented by a preferred embodiment of the Mobile Device Composition Studio in accordance with the present invention.

Tying together all the user-facing functionality of Composition Studio 120 is Graphical User Interface 260. This is a design module that provides graphical and interactional support for each of the functions already described. It is implemented, using techniques well known to those skilled in the art, in a manner that integrates with the functional modules and relies upon the features of User Interface Support Module 202. An example layout that may be used for User Interface 260 in a preferred embodiment of the present invention is shown in FIG. 6.

FIG. 3 depicts Distribution Center 130 in more detail, showing the major functional modules that embody the functionality outlined in the FIG. 1 description. As in FIG. 1, the significant external interfaces and corresponding cooperating elements outside Distribution Center 130 are also shown. The Composition Studio 120, Build Engine 140, Verification Engine 150, Service Interactions 132, 143, and 153, Internet Customer's Computer 180 and Network Connection 183, Internet Customer's Mobile Device 180, Mobile Customer's Mobile Device 191, Network Connection 193, and Embedment 139, and Application Downloads 108 and 109 shown in FIG. 3 are substantially as already described in the context of FIG. 1. Similarly, Network Communication Support Module 301, User Interface Support Module 302, User Database Module 303, Web Application Server 304, User Interaction Services 340, and Distribution Service 350 are all substantially as described in the foneClay Apps patent application.

At the core of Distribution Center 130 is the ability to store Applications 101, Application Components 102, Operating Software Packages 1001, Device Component Models 1002, and Custom Device Models 1004, along with information or metadata about each one. Library Services module 310 embodies this set of functions. Search Toolkit 311 offers users the ability to browse and search for specific items in the various repositories, using various attributes of the stored items as search keys. App Repository 312, SO Repository 313, and UO Repository 314 are all unchanged from the foneClay Apps system. In the present invention, they are joined by Device Component Model Repository 315, Custom Device Model Repository 316, and OS (Operating Software) Repository 317, which respectively store the available Device Component Models 1002, Custom Device Models 1004, and Operating Software Packages 1001.

On-Demand Order Service 320 is an extension of the On-Demand Download Service 320 described in the foneClay Apps patent application. This module provides functions associated with acquiring an item stored in Library Services module 310. Its Specific Mobile Device Selector 321, Build Engine Client 322, E-Commerce Engine 323, and Mobile Device OTA (Over The Air) Delivery Module 324 are identical to those modules in the foneClay Apps system. New in the present invention is the Device Factor Client 329, which links Distribution Center 150 to Device Factory 190 via Interaction 196 so as to enable manufacturing on request of Personalized and Mass-Customized Devices 198 and 199.

Mobile Device and Application Demonstrator 330 is an extension of the Mobile Application Demonstrator 330 described in the foneClay Apps patent application. It continues to provide the means of self education by offering a mechanism whereby customers may interact with foneClay Apps system and foneClay Device system products. In the present invention it is extended to support not only Applications 101 but also Operating Software Packages 1001, providing live simulations in the context of the Generic Mobile Device Model 103 via Generic Demonstrator 331, as well as in the context of both Specific Mobile Device Models 104, and now Custom Mobile Devices 1004, via Specific Device Selector and Simulators 332.

Tying together all the user-facing functionality of Distribution Center 130 is Graphical User Interface 370. This is a design module that provides graphical and interactional support for each of the functions already described. It is implemented, using techniques well known to those skilled in the art, in a manner that integrates with the functional modules and relies upon the features of User Interface Support Module 302. In a preferred embodiment, the layout of Graphical User Interface 370 will vary dynamically according to the preferences of customers and developers, and may in general resemble a combination of the features typically found in social networking, app store, and development project support systems that are in common use.

FIG. 4 depicts Build Engine 140 in more detail, showing the major functional modules that embody the functionality outlined in the FIG. 1 description. As in FIG. 1, the significant external interfaces and corresponding cooperating elements outside Build Engine 140 are also shown. The Composition Studio 120, Distribution Center 130, Verification Engine 150, Service Interactions 142, 143, and 154, and Embedment 124 shown in FIG. 4 are substantially as already described in the context of FIG. 1. Similarly, Network Communication Support Module 401, Computation Resource Management Module 402, and Build Service 420 are all substantially as described in the foneClay Apps patent application.

In the present invention, Build Engine 140 contains both the software build stack from the foneClay Apps system, supporting the builds for Applications 101, Application Components 102, and the new Operating Software Packages 1001, as well as a new hardware build stack that supports builds for Device Component Models 1002 and Custom Device Models 1004. The software stack is largely unchanged, though some of the names have been shortened to make room in the drawing, taking in Compilation Set 411, using in turn Generic Build Toolkit 432, Software Language Interpreter 433, Device Selector 434, Code Generators 43, Precompiled Objects 436, and Target Device SDKs and Tool Chains 440, and producing Target Executable 412. The Service Adaptation Framework 430 of the foneClay Apps system, which forms the core of the build stack, is enhanced in the present invention to provide hardware development tools that are analogous to the tools used in the software build stack. Thus extended, it is now the Service/Component Adaptation Framework.

The input to the hardware build stack, Model Set 412, expresses the physical aspects of the design being built, in the Visual and XML-Based Representation Language 431. This language is the same one used by the software stack, extended to express physical attributes and componentry; it is also the same as Language 210 used in Composition Studio 120.

Within the Service/Component Adaptation Framework 430, the transformational elements of the hardware build stack start with the Generic Model Toolkit 462, which contains common elements and frameworks needed to implement the components and their relationships as expressed in Model Set 412. To one skilled in the art, this will be readily recognizable as the glue logic and platforms that form a development team's common baseline. Next up is the Hardware Language Interpreter, which transforms the design as expressed in Language 431 into a group of related designs expressed in possibly several standard languages specific to the different aspects of the physical model, such as mechanical, electrical, electronic, and decorative. The Element Selector 464 controls selection of compatible parts from the vast variety of available off-the-shelf components. Model Synthesizers 465 are then executed to normalize and complete the deep details necessary to actually build a device, combining the developer's design as expressed and translated with detailed Component Models 466 provided by vendors or other developers. A Layout Engine 467 determines initial fine placement of each part so as to use space optimally while conforming to the developer's intent.

Emerging from the Framework 430, the design is handed off to device-specific Hardware Component CAD/CAM Development Kits and Tool Chains 450, as appropriate to each piece of the design. This step performs final synthesis and validation, including such crucial steps as timing analysis, interference analysis, thermal analysis, and others as would be well known to those skilled in the art. To the extent appropriate for functional cohesion and processing load distribution, this step occurs in conjunction with the Verification Engine 150 via Verification Engin Client 423 inside Build Service 420. Of particular interest at this point is verification of manufacturability, which Verification Engine 150 delegates to Device Factory 190 and then passes back to Build Engine 140.

At the end of this lengthy process is a completed Custom Device Hardware Model 415, which can be stored in the Distribution Center 130 and in turn handed to Device Factory 190 for manufacturing.

FIG. 5 depicts Verification Engine 150 in more detail, showing the major functional modules that embody the functionality outlined in the FIG. 1 description. As in FIG. 1, the significant external interfaces and corresponding cooperating elements outside Verification Engine 150 are also shown. The Composition Studio 120, Distribution Center 130, Build Engine 140, Device Factory 190, Service Interactions 152, 153, 154, and 159, and Embedment 125 shown in FIG. 5 are substantially as already described in the context of FIG. 1. Similarly, Network Communication Support Module 501, Computation Resource Management Module 502, Verification Service 560, and Interactive Verification Framework 530 are all substantially as described in the foneClay Apps patent application.

In the present invention, Verification Engine 150 is enhanced to provide both software verification as in the foneClay Apps system, supporting the testing of Applications 101, Application Components 102, and the new Operating Software Packages 1001, as well as hardware verification tools support testing Device Component Models 1002 and Custom Device Models 1004. Objects to be Verified 510 continues to represent the input set for a verification transaction; in the present invention it is enhanced with the ability to contain both software components and physical models. The software portion is largely unchanged, although the number and variety of tests in all modules of Test Plan Database 550 is necessarily larger for supporting Operating Software Packages 1001. Device Test Cases 551 and App/Component Tests 552 are extended in the present invention to include tests relevant to physical aspects of the item under test. Service Adaptation Framework Tests 553 remains to focus on testing the aspects of a design that are inherited from the software side of Framework 430, while Component Adaptation Framework Tests 554 provides tests that focus on the physical aspects inherited from the hardware side of Framework 430. Similarly within the Automatic Verification Framework 520, Test Case Execution Driver 521, Success Analyzer 522, and Device Interface 523 are all extended to support testing physical aspects of a design in addition to software aspects. Within Test Device Library 540 the Generic Model Simulator 541, Specific Model Selector 542, and Specific Model Simulator 543 remain essentially unchanged, while the set of Specific Devices 544 is extended to include an instance of each Mass-Customized Device 199; one-off Personalized Devices 198 are not included in the library. However, individual Component Models 545 are added to Test Device Library 540 whether provided by outside vendors or designed within the foneClay Device system, because they are reused extensively.

Entirely new to Verification Engine 150 are Manufacturability Tests 555 and Manufacturability Verifier Client 529, which work together and with Device Factory 190 via Interaction 159 to verify whether a Device Model 1004 or Component 1002 can feasibly emerge from the production line.

FIG. 6 is unchanged from the foneClay Apps patent application. In general, the new elements of Composition Studio 120 fit smoothly into their corresponding elements of GUI 260 due to their retention of the palette, canvas, and toolkit metaphors. Therefore, the description of this drawing in the foneClay Apps patent application is sufficient, and incorporated herein by reference.

Figure 7:
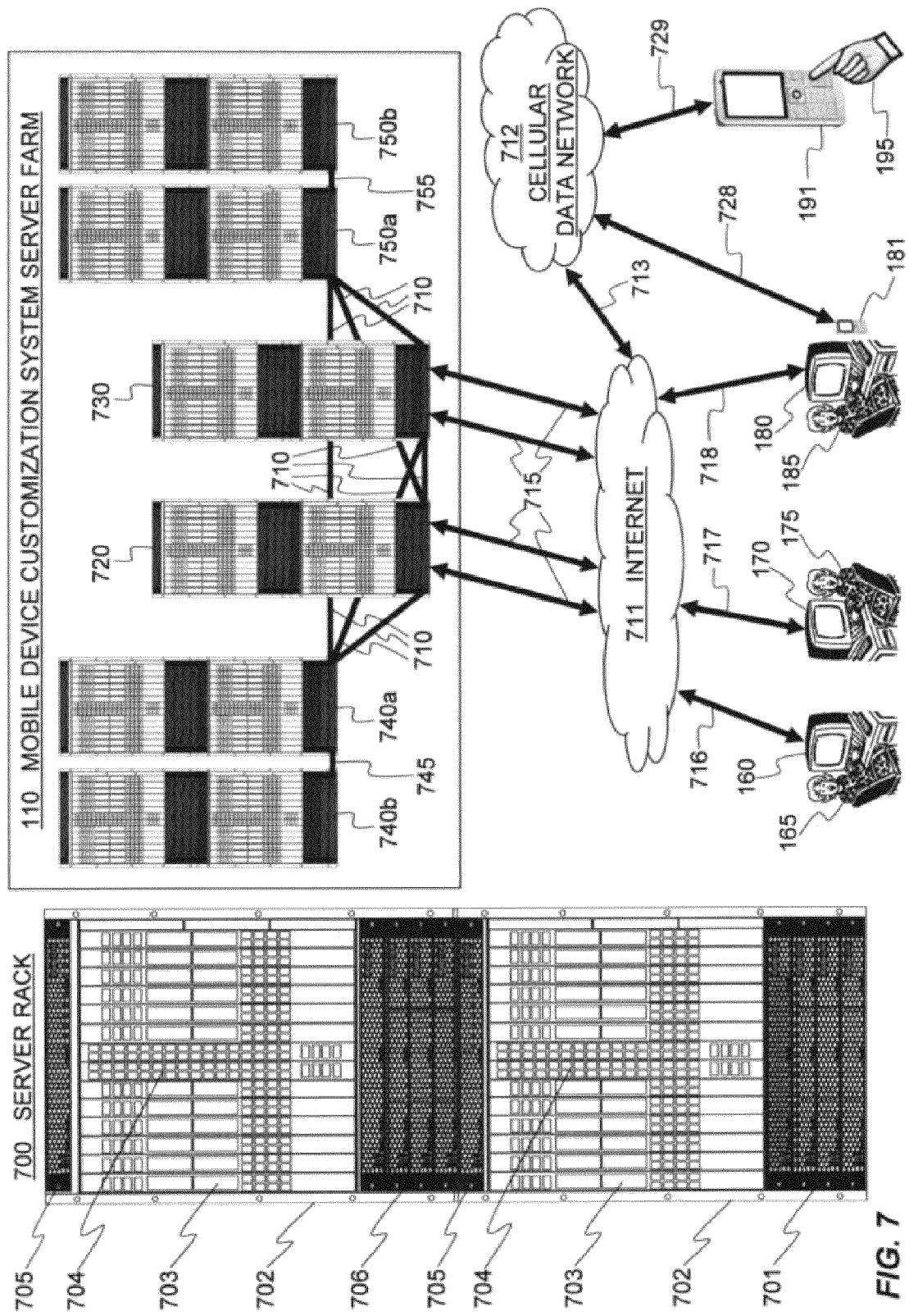
FIG. 7 illustrates an exemplary physical implementation architecture supporting a preferred embodiment of the software elements of the system of the present invention.

FIG. 7 depicts a physical implementation architecture for the computational elements of Mobile Device Customization System 1000 and its interacting elements, whereby each of the functional elements depicted in FIG. 1 may be executed and interconnected. This drawing covers all aspects of the system except the physical components of the manufacturing line in Device Factory 190, which are described under FIG. 8. Therefore, the description of FIG. 7 in the foneClay Apps patent application is sufficient, and incorporated herein by reference.

FIG. 8 depicts Device Factory 190 in more detail, showing the major functional modules that embody the functionality outlined in the FIG. 1 description. As in FIG. 1, the significant external interfaces and corresponding cooperating elements outside Device Factory 190 are also shown. The Distribution Center 130, Verification Engine 150, and Service Interactions 159 and 196 shown in FIG. 8 are substantially as already described in the context of FIG. 1.

Starting at the bottom of the diagram are fundamental modules typically found in any modern subsystem that relies at least partly on software control. Network Communication Support Module 901 provides connectivity with other subsystems of Device Customization System 1000, and contains such common and well known components as an inter-process message-passing software bus, message structure parsing toolkits, a TCP/IP protocol stack implementation, and networking hardware drivers appropriate for the computer hardware on which the software elements of Device Factory 190 run. As a background service, Device Factory 190 does not have a user interface support module comparable to those in Composition Studio 120 and Distribution Center 130. Device Factory 190 does, however, incorporate Computation Resources 902 that provide for operation of its other modules, some of which are implemented as server software and some of which have an automation aspect.

As a background service, to support interactions with the rest of System 1000 the active module of Device Factory 190 is the Manufacturing Service 920. Within Manufacturing Service module 920, Service Responder Module 921 is responsible for receiving requests from Device Factory Client 329 of Distribution Center 130 and Manufacturability Verifier Client 529 of Verification Engine 150 via Service Interactions 196 and 159, respectively, passing these requests to their appropriate handlers, and returning results to them.

Order Processing Service 923 is the subset of Manufacturing Service 920 that supports Interaction 159 with Distribution Center 130. Its job is to handle requests from Device Factory Client 329 for construction and delivery of one or more specific Devices 198 or 199. The order comes in the form of Descriptors for Objects to be Manufactured 910, which contains one or more Custom Device Models 1004 describing exactly what hardware to produce, one or more Operating Software Packages 1001 to install in the produced items, and information regarding how many instances to produce and where to ship them. Order Processing Service 923 interacts with the other modules of Device Factory 190 to effect the requested order. In particular, the various production procedures for a specific order are pulled from Manufacturing Rules Database 930, and used to drive the production line elements described hereinafter.

Manufacturability Verifier Service 925 is the subset of Manufacturing Service 920 that supports Interaction 196 with Verification Engine 150. Its job is to handle requests from Manufacturability Verifier Client 529 for judgments regarding whether a particular Custom Device Model 1004 or Device Component 1002, conveyed via Descriptors for Objects to be Manufactured 910, can feasibly be produced. Manufacturability Verifier Service 925 performs the necessary analysis using information from Manufacturing Rules Database 930, particularly Manufacturability Tests 935.

As hinted in the foregoing, essential to the operation of Manufacturing Service 920 is the Manufacturing Rules Database 930. This module contains all the information required to drive the physical parts of Device Factory 190, and all the information required to transform a Custom Device Model 1004 or Device Component Model 1002 into an actual physical item. Manufacturing Rules Database 930 incorporates a number of information elements, including but not limited to the following.

Component Fit Rules 931 describe how Device Component Models 1002 and components included in a particular Custom Device Model 1004 are able to fit together, including their form factors, electrical and mechanical interface specifications, and compatibility information. That is, any information typically found in a component data sheet or application guide is embodied in this module. This information is used in judging manufacturability as well as in guiding production of an item.

Operating Software (OS) Compatibility Rules 932 embody the allowed relationships between Operating Software Packages 1001 and the hardware components required for a specific Custom Device Model 1004. Manufacturing Service 920 will not proceed with an order in which the Model 1004 and OS 1001 are incompatible.

Assembly Rules 933 describe the procedures and order of operations used to assemble a particular item. This includes detailed assembly procedures for specific components, as well as logic for ordering individual procedures and formulating end to end procedures required for production of a Personalized Device 198 or Mass-Customized Devices 199 as end items.

Factory Tests 934 embody the test procedures to be executed on an end item prior to its release from Device Factory 190.

As previously mentioned, Manufacturability Tests 935 describe the rules for determining whether a Model 1002 or Model 1004 can be produced, without actually producing it. This is an important design-time activity that reduces waste and expense associated with trying to produce infeasible end items.

The remainder of Device Factory 190 are the elements that constitute its production line. These elements are primarily automated and robotic machines that are driven by Manufacturing Service 920 according to procedures in Rules Database 930. They are required by the present invention for it to operate, but their specific implementations are not necessarily unique to it. In fact, a preferred embodiment of the present invention incorporates off-the-shelf existing manufacturing equipment and processes to implement this part of Device Factory 190. Note also that not all procedures may be feasibly automated in the manufacture of end items contemplated under System 1000. Therefore, to whatever extent is necessary for accommodating such procedures, human operators may also be incorporated in any of these modules.

Component Supply 940 embodies both the external supply chain for the factory, and the internal mechanisms that ensure the right parts, including both complex items and raw materials, are selected and incorporated into a particular order. Warehouse storage, conveyors, and other ordinary tools well known to those skilled in the art comprise this module.

Machining Facility 950 consists of machine tools that fabricate and shape such items as custom housings, buttons, and other metal or plastic pieces.

Assembly Facility 960 consists of robotic factory tools such as pick-and-place machines, and other stations commonly found on any electronic device production line.

OS Installation Facility 970 brings the produced hardware together with the Operating Software Package 1004 specified for an order. Numerous methods are available for accomplishing this step, such as loading a flash memory device prior to its incorporation into the end item, or attaching an end item to a computer workstation and executing a download process. The present invention does not constrain which procedure is to be used here. In fact, multiple such procedures may be necessary in Device Factory 190, depending on the variety of componentry and design capabilities implemented in any particular instance of System 1000.

Factory Test Facility 980 provides pre-delivery verification of a completed end item, operating according to Factory Tests 934 found in Manufacturing Rules Database 930. Multiple aspects are tested. Visual Inspector 981 verifies the form factor and decoration. Mechanical Tester 982 checks robustness and ensures proper functioning of any articulations or moving parts. Electronics Tester 983 checks for correct power-up and OS execution, and verifies that electrical and electromagnetic interfaces (including radio frequency emissions) operate within legal, safe, and functionally correct envelopes.

Finally, when a Personalized Device 198 is ready or a batch of Mass-Customized Devices 199 is complete, Delivery Facility 990 sends it out the door to the waiting customer, wholesale distributor, or retail facility.

The invention has been described above with reference to preferred embodiments. It is not intended that the invention be limited to the specific embodiments shown and described, but that the invention be limited in scope only by the claims appended hereto. It will be evident to those skilled in the art that various substitutions, modifications, and extensions may be made to the embodiments as well as to various technologies which are utilized in the embodiments. It will also be appreciated by those skilled in the art that such substitutions, modifications, and extensions fall within the spirit and scope of the invention, and it is intended that the invention as set forth in the claims appended hereto includes all such substitutions, modifications, and extensions.

We claim:

1. A computer-implemented method for creating, managing and distributing a mobile device operating software package, the method comprising:
   receiving a selection of at least one of a logic and data element from at least one of a shape, component, connections, color, and label palette to add to a data and logic canvas and a user interaction element from at least one of a graphic, widget, audio/video, or haptic palette to add to a multimedia user interaction canvas to form a mobile device operating software package;
   testing the mobile device operating software package using a generic device model testing module;
   submitting the mobile device operating software package to a distribution center; and
   distributing the mobile device operating software package to a mobile device.

2. The computer-implemented method of claim 1 further comprising:
   compiling the mobile device operating software package into an executable operating software suitable for a target mobile device;
   submitting the mobile device operating software package to a build engine for builds using a plurality of specific mobile device models; and
   verifying the mobile device operating software package using a specific mobile device model.

3. The computer-implemented method of claim 2, further comprising:
   receiving a compilation set of the mobile device operating software package using a generic build toolkit;
   translating the compilation set using a software language interpreter and a code generator, wherein the code generator is selected at least partly based on a target device determined by a device selector;
   combining the translated compilation set with one or more precompiled objects; and
   producing a target device-specific executable operating software using a specific mobile device model selected from target device-specific software development kits and tool chains.

4. The computer-implemented method of claim 3, wherein the receiving, translating, combining, and producing are performed by the build engine.

5. The computer-implemented method of claim 1, wherein testing the mobile device operating software package comprises:
retrieving a set of device test cases from a test plan database;
retrieving a set of application and component tests from the test plan database;
retrieving a set of service adaptation framework tests from the test plan database; and
using the generic device model testing module to perform the set of device test cases, the set of application and component tests, and the set of service adaptation framework tests.

6. The computer-implemented method of claim 5, wherein verifying the mobile device operating software package comprises:
receiving a selection of a specific mobile device from a specific mobile device selector;
retrieving a specific device instance corresponding to the specific mobile device from a set of specific actual mobile device instances; and
using the specific mobile device model simulator to verify the mobile device operating software package using the specific device instance.

7. The computer-implemented method of claim 6, wherein testing the mobile device operating software package using the generic device model testing module and verifying the mobile device operating software package using the specific mobile device model simulator are performed by a verification engine.

8. A computer program product, comprising a computer usable medium having a computer readable program code embodied therein, the computer readable program code adapted to be executed to implement a method for creating, managing and distributing a mobile device operating software package, the method comprising:
receiving a selection of at least one of a logic and data element from at least one of a shape, component, connections, color, and label palette to add to a data and logic canvas and a user interaction element from at least one of a graphic, widget, audio/video, or haptic palette to add to a multimedia user interaction canvas to form a mobile device operating software package;
testing the mobile device operating software package using a generic device model testing module;
submitting the mobile device operating software package to a distribution center; and
distributing the mobile device operating software package to a mobile device.

9. The computer program product of claim 8 further comprising:
compiling the mobile device operating software package into target executable software suitable for a target mobile device;
submitting the mobile device operating software package to a build engine for builds using a plurality of specific mobile device models; and
verifying the mobile device operating software package using a specific mobile device model.

10. The computer program product of claim 8, wherein submitting the mobile device operating software package to the distribution center comprises:
sending the mobile device operating software package to the distribution center; and
storing the mobile device operating software package in an operating software repository maintained by the distribution center.

11. The computer program product of claim 8, wherein distributing the mobile device operating software package comprises:
receiving a selection of the mobile device operating software package;
retrieving the mobile device operating software package from the operating software repository; and
sending the mobile device operating software package to a device factory for use in manufacturing a set of mobile devices.

12. The computer program product of claim 11, wherein receiving the selection of the mobile device operating software package comprises:
determining a set of stored mobile device operating software packages available to a user;
providing the set of stored mobile device operating software packages to the user; and
allowing the user to search the set of stored mobile device operating software packages using attributes of the stored mobile device operating software packages.

13. The computer program product of claim 12, wherein the providing and allowing are performed using a graphical user interface.

14. The computer program product of claim 8 further comprising sending the mobile device operating software package to a device factory.

15. A mobile device operating software package made by the operations of:
receiving a selection of at least one of a logic and data element from at least one of a shape, component, connections, color, and label palette to add to a data and logic canvas and a user interaction element from at least one of a graphic, widget, audio/video, or haptic palette to add to a multimedia user interaction canvas to form a mobile device operating software package;
testing the mobile device operating software package using a generic device model testing module;
submitting the mobile device operating software package to a distribution center; and
distributing the mobile device operating software package to a mobile device.

16. The mobile device operating software package made by the operations of claim 15 further comprising the operations of:
compiling the mobile device operating software package into target executable software suitable for a target mobile device;
submitting the mobile device operating software package to a build engine for builds using a plurality of specific mobile device models; and
verifying the mobile device operating software package using a specific mobile device model.

17. The mobile device operating software package made by the operations of claim 16 further comprising the operations of:
receiving a compilation set of the mobile device operating software package using a generic build toolkit;
translating the compilation set using a software language interpreter and a code generator, wherein the code generator is selected at least partly based on a target device determined by a device selector;
combining the translated compilation set with one or more precompiled objects; and
producing a target device-specific executable operating software using a specific mobile device model selected from target device-specific software development kits and tool chains.

18. The mobile device operating software package made by the operations of claim 17, wherein the receiving, translating, combining, and producing are performed by the build engine.

19. The mobile device operating software package made by the operations of claim 15, wherein submitting the mobile device operating software package to the distribution center comprises the operations of:
   sending the mobile device operating software package to the distribution center; and
   storing the mobile device operating software package in an operating software repository maintained by the distribution center.

20. The mobile device operating software package made by the operations of claim 15, wherein distributing the mobile device operating software package comprises the operations of:
   receiving a selection of the mobile device operating software package;
   retrieving the mobile device operating software package from the operating software repository; and
   sending the mobile device operating software package to a device factory for use in manufacturing a set of mobile devices.

21. A system for creating, managing and distributing a mobile device operating software package, the system comprising:
   a mobile device operating software package comprising a complete set of logic and data associated with functions available to a mobile device user;
   a generic mobile device model comprising a superset of mobile device features and capabilities;
   a composition studio adapted to receive a plurality of sets of selections, each set of selections associated with a set of operating software package components; and
   a distribution center adapted to store operating software packages and associated metadata.

22. The system of claim 21 further comprising:
   a specific mobile device model comprising features and capabilities associated with a particular mobile device;
   a build engine adapted to receive build requests from the composition studio and the distribution center and generate a plurality of mobile device operating software packages; and
   a verification engine adapted to test operation of each operating software package using a library of test cases associated with the generic mobile device model and the specific mobile device model.

23. A computer-implemented method for creating, manufacturing, and distributing a customized or personalized mobile device, the method comprising:
   receiving a selection of at least one physical design element from at least one of a shape, component, connections, color, and label palette to add to a physical canvas to form a custom mobile device model;
   receiving a selection of at least one of:
      a logic and data element from at least one of a shape, component, connections, color, and label palette to add to a data and logic canvas,
      a user interaction element from at least one of a graphic, widget, audio/video, or haptic palette to add to a multimedia user interaction canvas to form a mobile device operating software package, and
      an existing mobile device operating software package from a library;
   testing the mobile device operating software package using a generic mobile device model testing module, a mechanical simulator, and an electromagnetic simulator;
   submitting the custom mobile device model and mobile device operating software package to a distribution center;
   sending the custom mobile device model to a device factory;
   automatically manufacturing a custom mobile device according to the design specified by the custom mobile device model;
   installing the mobile device operating software package in the custom mobile device; and
   delivering the custom mobile device.

24. The computer-implemented method of claim 23, further comprising verifying manufacturability of the custom mobile device model at least partly based on a database of component fit rules, assembly rules, and manufacturability tests.

25. The computer-implemented method of claim 23, further comprising:
   compiling the mobile device operating software package into an executable operating software suitable for the custom mobile device; and
   verifying the mobile device operating software package using a verification engine, the custom mobile device model, and a database of operating software compatibility rules.

26. The computer-implemented method of claim 23, wherein automatically manufacturing comprises:
   machining parts as specified by the custom mobile device model and in accordance with a database of component fit rules; and
   assembling mechanical and electronic components as specified by the custom mobile device model and in accordance with a database of assembly rules.

27. The computer-implemented method of claim 23, wherein automatically manufacturing comprises using a factory test facility and a database of factory tests to automatically confirm that the custom mobile device conforms to the custom mobile device model.

28. The computer-implemented method of claim 27 further comprising:
   visually inspecting the custom mobile device;
   verifying the mechanical aspects of the custom mobile device; and
   verifying the electronic and electromagnetic aspects of the custom mobile device.

29. A computer program product, comprising a non-transitory computer usable medium having a computer readable program code embodied therein, the computer readable program code adapted to be executed to implement a method for creating, manufacturing, and distributing a customized or personalized mobile device, the method comprising:
   receiving a selection of at least one physical design element from at least one of a shape, component, connections, color, and label palette to add to a physical canvas to form a custom mobile device model;
   receiving a selection of at least one of:
      a logic and data element from at least one of a shape, component, connections, color, and label palette to add to a data and logic canvas,
      a user interaction element from at least one of a graphic, widget, audio/video, or haptic palette to add to a multimedia user interaction canvas to form a mobile device operating software package, and an existing mobile device operating software package from a library;

testing the custom mobile device model and mobile device operating software package using a generic mobile device model testing module, a mechanical simulator, and an electromagnetic simulator;

submitting the custom mobile device model and mobile device operating software package to a distribution center; and sending the custom mobile device model to a device factory.

30. The computer program product in accordance with claim 29, further comprising:

compiling the mobile device operating software package into an executable operating software suitable for the custom mobile device model; and verifying the mobile device operating software package using a verification engine, the custom mobile device model, and a database of operating software compatibility rules.

31. The computer program product in accordance with claim 29, further comprising verifying manufacturability of the custom mobile device model using a database of component fit rules, assembly rules, and manufacturability tests.

32. An automatic factory configured to produce a custom mobile device in accordance with a custom mobile device model received from a computer-implemented distribution center, the factory operating according to a method comprising:

machining parts as specified by the custom mobile device model and in accordance with a database of component fit rules;

assembling mechanical and electronic components as specified by the custom mobile device model and in accordance with a database of assembly rules;

installing a mobile device operating software package in the custom mobile device;

using a factory test facility and a database of factory tests to automatically confirm that the custom mobile device conforms to the custom mobile device model; and distributing the custom mobile device.

33. The automatic factory of claim 32, wherein the operating method further comprises:

visually inspecting the custom mobile device;

verifying the mechanical aspects of the custom mobile device; and verifying the electronic and electromagnetic aspects of the custom mobile device.

34. A customized mobile device made by the operations of:

receiving a selection of at least one physical design element from at least one of a shape, component, connections, color, and label palette to add to a physical canvas to form a custom mobile device model;

receiving a selection of at least one of:

a logic and data element from at least one of a shape, component, connections, color, and label palette to add to a data and logic canvas, a user interaction element from at least one of a graphic, widget, audio/video, or haptic palette to add to a multimedia user interaction canvas to form a mobile device operating software package, and an existing mobile device operating software package from a library;

testing the custom mobile device model and mobile device operating software package using a generic mobile device model testing module, a mechanical simulator, and an electromagnetic simulator;

submitting the custom mobile device model and mobile device operating software package to a distribution center;

sending the custom mobile device model to a device factory;

automatically manufacturing a custom mobile device according to the design specified by the custom mobile device model;

installing the mobile device operating software package in the custom mobile device;

using a factory test facility and a database of factory tests to automatically confirm that the custom mobile device conforms to the custom mobile device model; and delivering the custom mobile device to a customer.

35. A system for creating, manufacturing, and distributing a customized mobile device, the system comprising:

a mobile device operating software package comprising a complete set of logic and data associated with functions available to a mobile device user;

a mobile device component model comprising a representation of a hardware or software component that may be used in design and construction of a mobile device;

a custom mobile device model comprising the entire design of a complete custom mobile device;

a generic mobile device model comprising a superset of mobile device features and capabilities;

a composition studio adapted to receive a plurality of sets of selections, each set of selections associated with a set of mobile device components;

a distribution center adapted to store data associated with the customized mobile device; and a device factory adapted to provide physical manufacturing of the customized mobile device.

36. The system of claim 35 further comprising:

a build engine adapted to generate the operating software package and provide physical attributes of the customized mobile device; and a verification engine adapted to test operation of the mobile device operating software package.

* * * * *